United States Patent
Westerberg et al.

(10) Patent No.: US 8,229,365 B2
(45) Date of Patent: Jul. 24, 2012

(54) METHOD AND A DEVICE FOR REDUCED INTERFERENCE IN A CELLULAR ACCESS SYSTEM

(75) Inventors: Erik Westerberg, Enskede (SE); David Astely, Bromma (SE); Hannes Ekstrom, Stockholm (SE); Per Skillermark, Stockholm (SE); Tobias Tynderfeldt, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 476 days.

(21) Appl. No.: 12/527,959

(22) PCT Filed: Feb. 22, 2007

(86) PCT No.: PCT/SE2007/050107
§ 371 (c)(1),
(2), (4) Date: Aug. 20, 2009

(87) PCT Pub. No.: WO2008/103089
PCT Pub. Date: Aug. 28, 2008

(65) Prior Publication Data
US 2010/0113076 A1 May 6, 2010

(51) Int. Cl.
*H04B 17/00* (2006.01)
(52) U.S. Cl. .......... 455/67.11; 455/63.1; 455/524; 455/507; 455/511
(58) Field of Classification Search ........... 455/67.11, 455/63.1, 524, 507, 511, 500
See application file for complete search history.

(56) References Cited

U.S. PATENT DOCUMENTS

| | | | | |
|---|---|---|---|---|
| 6,519,477 | B1* | 2/2003 | Baier et al. | 455/67.11 |
| 7,155,229 | B2* | 12/2006 | Dent | 455/450 |
| 7,242,908 | B2* | 7/2007 | Darwood et al. | 455/67.11 |
| 7,376,200 | B2* | 5/2008 | Demir et al. | 375/296 |
| 7,423,961 | B2* | 9/2008 | Ogawa et al. | 370/210 |
| 7,639,986 | B2* | 12/2009 | Vincent | 455/63.1 |
| 2003/0153275 | A1* | 8/2003 | Oh et al. | 455/67.6 |
| 2003/0228877 | A1* | 12/2003 | Haapoja | 455/522 |

FOREIGN PATENT DOCUMENTS

| | | |
|---|---|---|
| EP | 1511190 A1 | 3/2005 |
| GB | 2356774 A | 5/2001 |
| GB | 2375692 A | 11/2002 |

OTHER PUBLICATIONS
International Search Report for PCT/SE2007/050107 dated Nov. 28, 2007.
International Preliminary Report on Patentability for PCT/SE2007/050107 dated Mar. 25, 2009.

* cited by examiner

*Primary Examiner* — Yuwen Pan
(74) *Attorney, Agent, or Firm* — Potomac Patent Group PLLC (57) ABSTRACT

A method for use in a cellular system comprising a plurality of base stations with corresponding cells, in which system the communication between users in a cell and the base station is divided into an up link period and a down link period, the method comprising letting a controlling node instruct the base stations regarding: a first point in time when the base station should start transmitting a control signal; a second point in time when the base station should start to listen for control signals from other base stations and measure their time of arrival and signal strength; a third point in time when the base station should cease listening for control signal; and a fourth point in time when the base station should transmit the measurements results to a receiving node in the system.

14 Claims, 8 Drawing Sheets

|        | RBS 122      |       |
|--------|--------------|-------|
|        | P            | t     |
| $T_{112}$ | -103 dBm   | 6 µs  |
| $T_{122}$ | -            | -     |
| $T_{132}$ | -85 dBm    | 2 µs  |
| $T_{142}$ | << -110 dBm | N/A   |

Fig. 4

|  | I (RBS) | | | |
|---|---|---|---|---|
|  | RBS 112 | RBS 122 | RBS 132 | RBS 142 |
| RBS 112 | - | -78dBm, 3μs | -103dBm, 6μs | < -110dBm |
| RBS 122 | -78dBm, 3μs | - | -85dBm, 2μs | < -110 dBm |
| RBS 132 | -103dBm, 6μs | -85dBm, 2μs | - | < -110 dBm |
| RBS 142 | < -110dBm | < -110dBm | < -110dBm | - |

METHOD AND A DEVICE FOR REDUCED INTERFERENCE IN A CELLULAR ACCESS SYSTEM

TECHNICAL FIELD

The present invention discloses a method for use in a cellular access system in which there is a first plurality of base stations, each of which controls the traffic to and from at least one cell in the system. In the system in which the invention may be applied, communication between users in a cell and the base station of the cell is divided into an up link period during which users may transmit to their base station, and a down link period during which a base station may transmit to users in the cell of the base station.

BACKGROUND

In cellular radio communications systems, it is important to avoid simultaneous transmission from User Equipments, UEs, also known as Mobile Stations, MS, and Radio Base Stations, RBSs, especially if the transmission are on or near the same frequency and are in the same geographical area.

One reason for this is that the RBSs transmit with a much higher output power than the UEs. Additionally, the propagation conditions between the RBSs are typically different as compared to the propagation conditions between the RBSs and the UEs. For example, there may be line-of-sight between two RBSs antennas, whereas there is typically not line-of-sight between more than one RBS and a UE.

Thus, an RBS in one cell, which transmits on the same frequency as a UE in a neighbouring cell, may therefore interfere with the typically much weaker UE signal, so that the RBS in the neighbouring cell, for which the transmissions from the UE are intended, cannot decode the information in the radio communication from the UE. This phenomenon is known as "RBS to RBS interference".

In a system which utilizes the so called TDD principle, (Time Division Duplex), during specified time periods, the up link frames, only transmission from the UEs to the RBSs is allowed, and during other specified time periods, the downlink frames, only transmission to the UEs from the RBSs is allowed.

One well-know method of avoiding "RBS to RBS interference" in TDD systems is to separate all up link transmissions in the system or at least in a group of cells in the system, from the down link transmissions in the system or in the group of cells. By alternating the system, or the group of cells, between uplink and downlink frames, the UEs and RBSs can communicate while avoiding the RBS to RBS interference problem.

Additionally, up link and down link frames are separated from each other by guard periods to account for e.g. propagation delays, timing advance and hardware switching times between receive and transmit. In current TDD systems, such as UTRA TDD and WiMAX, the guard periods are typically given by the standard and the same guard period is used in all of the cells in the system. Also, the guard periods are generally chosen to match the maximum round trip propagation delays between a base station and terminals at the border of the cell of the base station.

An additional factor to take into account in TDD systems is the non-zero propagation time of the radio signals transmitted from the RBSs. Due to this phenomenon, transmissions from one RBS will arrive at other RBSs slightly delayed with respect to the transmission time in the first RBS. Thus, the guard periods must to some extent also be chosen so that down link transmissions from one RBS do not coincide with the up link periods in other RBSs.

SUMMARY

A drawback with the existing solutions to the problems described above in TDD systems comes from the fact that the guard periods define a time period during which no data can be sent in either direction. Thus, a long guard period between the up link and down link periods will reduce the system capacity. A particular problem with known solutions to the RBS-RBS interference problem is that the guard periods are "global", i.e. common for the entire system or area, and are set based on the "worst" RBS pair in the area. Also, this "worst" RBS pair must be identified, and as the system is expanded with more and more RBSs are added, the worst pair must be identified again.

Thus, there is a need for a solution by means of which the drawbacks of the present solutions to the problems with TDD systems can be improved upon.

This need is addressed by the present invention in that it discloses a method for use in a cellular access system in which there is a first plurality of base stations, each of which controls the traffic to and from at least one cell in the system.

In the system in which invention may suitably be applied, the communication between users in a cell and the base station of the cell is divided into an up link period during which users may transmit to their base station, and a down link period during which a base station may transmit to users in the cell of the base station.

The method of the invention comprises letting a controlling node in the system send instructions to a first and a second base station in the first plurality of base stations, the instructions to the first base station comprising information regarding at least a first point in time when the first base station should transmit a control signal.

The instructions to the second base station comprise information regarding:
  at least a second point in time when the second base station should start to listen for control signals and measure their time of arrival and signal strength,
  at least a third point in time when the second base station should cease listening for control signals,
  at least a fourth point in time when the second base station should transmit the measurements results to the controlling node, said results comprising the time of arrival and signal strength of the control signals.

Thus, by means of the invention, it will be possible for a controlling node in the system to check if base stations interfere with each other, and to what extent. Using this information on the interference between RBS within, for example, a certain area, the guard periods between down link and up link transmissions may be set in a more adequate fashion than previously thus increasing the radio network capacity.

The control node used in the invention may be a central node in the system, such as an Operation and Maintenance, O & M, node, but it is also conceivable to let the controlling node be another component in the system, such as, for example, a base station in the system, which has been equipped with means for acting as such a control node.

The invention also discloses a node such as an O&M node or an RBS which comprises functions for carrying out the method of the invention, as well as an RBS for use in a system of the invention.

BRIEF DESCRIPTION OF THE DRAWINGS

The invention will be described in more detail in the following, with reference to the appended drawings, in which.

DETAILED DESCRIPTION

Figure 1:
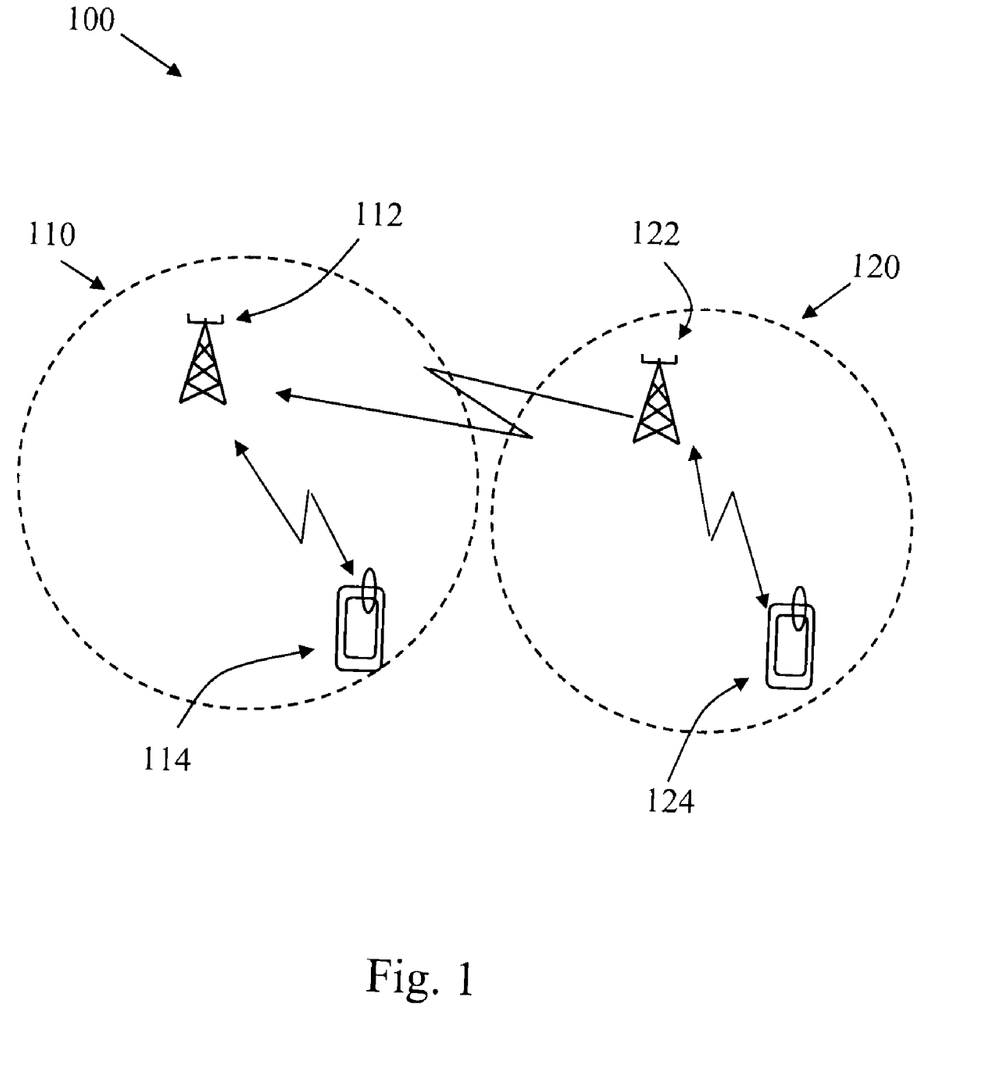
FIG. 1 shows a problem intended to be addressed by the present invention.

FIG. 1 schematically shows a system 100 in which the invention may be applied. The system 100 is a cellular wireless access system, and as such comprises a number of cells, two of which are shown in FIG. 1 with the reference numbers 110 and 120, respectively.

The cell 110 comprises at least one radio base station, an RBS, shown as 112 in FIG. 1. The RBS 112 serves, inter alia, to control the traffic to and from users in the cell 110. The cell 110 can accommodate at least one user terminal, shown in FIG. 1 with the reference number 114. Similarly, the cell 120 is shown as comprising an RBS 122 and a UE 124

The system 100 is shown as a cellular telephony system, and the invention will be described with reference to such a system, but it should be pointed out that this is by way of example only, the invention may be applied to a number of different kinds of cellular wireless access systems.

Also, the terminology used when describing the invention with reference to the system 100 is merely intended to facilitate the reader's understanding of the invention and is not intended to restrict the scope of protection sought for the present invention. For example, the term "base station" or "radio base station", RBS, should be interpreted as meaning a node in the system with the function of an RBS. In some systems, for example, a function essentially corresponding to that of the RBS is performed by a node called Node B. Such systems are naturally also encompassed by the invention.

Similarly, it should be realized that the term user equipment or UE is merely an example intended to facilitate the reader's understanding of the invention. For example, in some systems, the terms UT, User Terminal, or MS, Mobile Station, are used. Naturally, such systems are also encompassed by the scope of the present invention.

In addition, although the UEs 114 and 124 are shown as cellular telephones in FIG. 1, it should be realized that this is merely to facilitate the understanding of the invention, the UEs may be many other kinds of devices, portable or stationary, such as, for example, computers.

As explained previously in this text, the UEs 114 and 124 can send traffic to their respective RBS, i.e. RBSs 112 and 122, as well as being able to receive traffic from their RBSs. This is shown by means of arrows between each of the RBSs and its respective UE. A problem in systems of the kind 100 shown in FIG. 1 is that transmission from one RBS, which are thus intended for the UEs in the cell of that RBS, may be received by other RBS in the system 100.

Such inter-RBS interference is indicated in FIG. 1 by means of an arrow from the RBS 122 to the RBS 112, and may be present, for example, if the system 100 is a TDD system, Time Division Duplex.

In TDD systems, communication is divided into up link periods, UL periods, during which the UEs may transmit to their RBSs, and downlink, DL, periods, during which the RBSs may transmit to their UEs.

Thus, the system 100 will alternate between UL and DL periods, at specified intervals, in order to eliminate inter-RBS interference.

In order to additionally reinforce the effect afforded by the time division principle of the TDD system, so called guard periods may be inserted at the transition from UL to DL, and at the transition from DL to UL. The guard periods are periods in time during which no transmissions may be made by any party, neither UE nor RBS. The guard periods are intended to take into account a variety of effects such as, for example, switching times from send to transmit and vice versa, propagation delays in the system etc.

If the guard periods are too short, problems with interference will be encountered, while, on the other hand, if the guard periods are too long, this will result in a degraded system performance, since no transmissions at all may be made during the guard periods.

Briefly, in order to be able to decide how long the guard periods should be, the system or the operator of the system needs information regarding a set of properties of the radio network. In particular the system, or operator, needs to know the signal strength with which a radio signal transmitted by a first RBS with a known output power will be received by a second RBS in the system.

In addition the system, or operator, needs to know the time it takes for the radio signal to propagate from the first RBS to the second RBS, the so called propagation time between the first and second RBSs.

In one aspect of the problem to be solved by the invention, the system, or the operator needs to know the properties mentioned above, i.e. the received signal strength and propagation delay between every possible pair of RBSs in the network. If the operator or the system has access to this information, it would be possible to more or less set individual guard periods for each RBS in the system or in an area covered by the system, depending on how much interference each RBS causes for each of the other RBSs. As an alternative, it would be possible to set a global guard time used by each RBS in the system, or in a group of RBSs to which the invention is applied, to a lower value than would have been possible otherwise, which would thus increase the total traffic capacity of the system.

A basic concept of the invention is a method that uses self-measurements in the network, or parts of the network, to provide information about which RBSs that are exposed to interference and which of the other RBSs in the system or sub-system that cause this interference. Information is also provided by the method of the invention about how long a guard period would need to be in each RBS in order to avoid the RBS to RBS interference, or to keep the interference at an acceptable level.

The method is based on co-ordinated transmissions and measurements in the RBSs, with the measurement results being sent to a controlling node for processing and analysis. The result of the analysis can either be used by the O&M, (Operation and Maintenance) part of the system for automated guard time setting, i.e. a self-tuning system, or presented to the operator as input to manual decisions regarding, for example, guard times and other actions.

Figure 2:
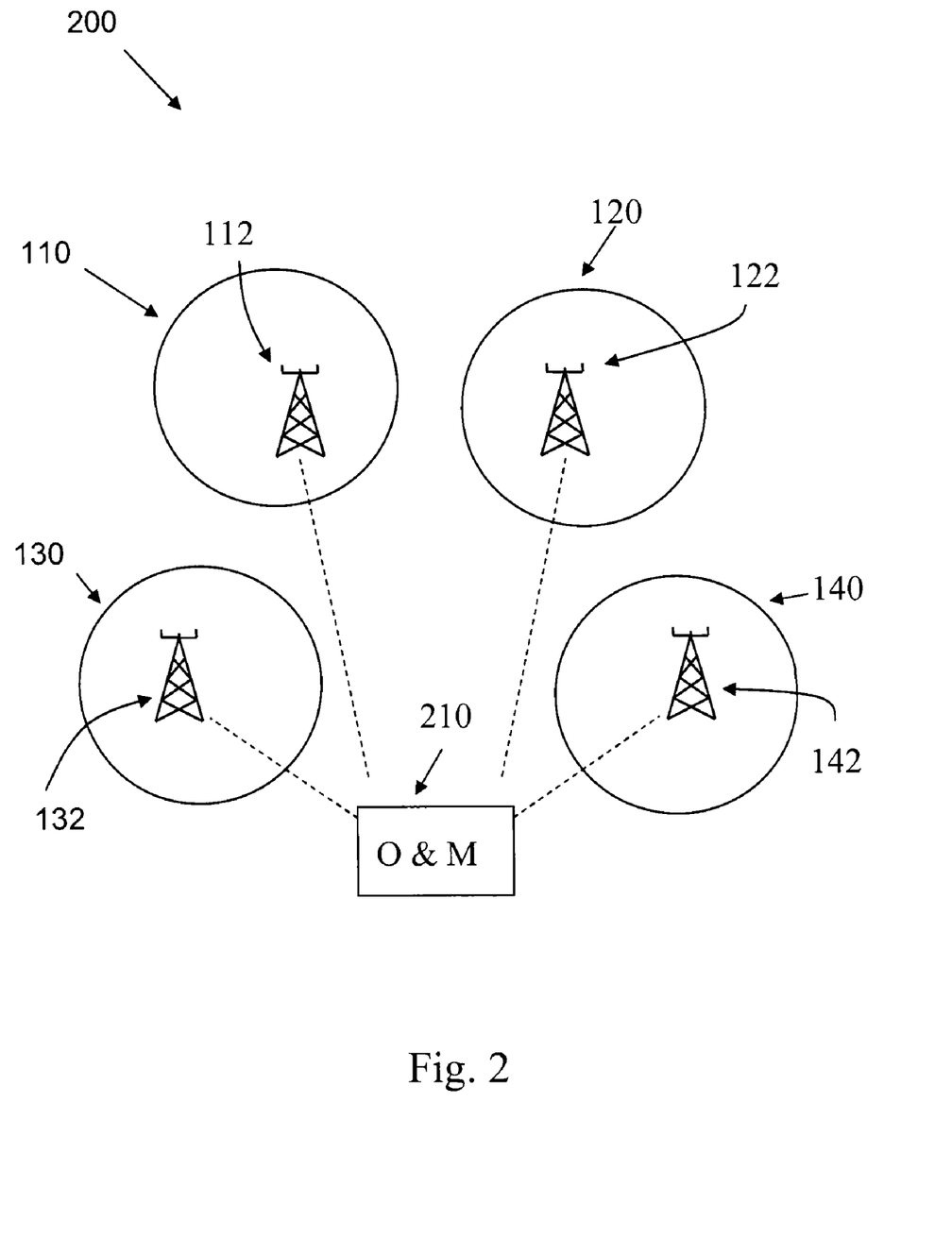
FIGS. 2 and 3 show systems according to the invention.

A basic principle of the invention will now be described with reference to FIG. 2. In FIG. 2, a TDD system 200 comprising four cells 110, 120, 130, 140, is shown, each cell comprising one RBS, 112, 122, 132, 142. The amount of cells shown in the system 200 is naturally just an example, the amount of cells to which the invention can be applied is in principle unlimited.

In addition to the four cells and their RBSs, the system 200 comprises a controlling node 210. The function of the controlling node 210 can be assumed by an O & M function in the system, or by another node, such as for example an RBS which as been equipped for such a role, suitably one of the RBSs comprised in the system 200 shown in FIG. 2.

The controlling node 210, according to the invention, instructs each of the RBSs in the group which is covered by the invention to start transmitting a control signal at a certain first point in time. In one embodiment of the invention, the control node can instruct the RBSs to let the control signal be in the form of a random sequence, and in another embodiment the control node can instruct the RBS to let the control signal be in the form of a known sequence. In a third embodiment, either of these control signals can be transmitted by the RBSs, as controlled by the control node.

Alternatively, the control signal can comprise control information, such as the RBS identity which may be expressed by means of the so called Cell Global Identity, CGI, which is used in 3GPP systems, but the RBS identity may naturally be expressed in other ways also within the scope of the invention. The control information can also comprise, for example, the output power used in the transmission of the control signal, the time of transmission of the control signal, and/or other information relevant to the problem of identifying and classifying RBS to RBS interference relations.

The controlling node 210 further instructs each of the RBSs in the group to start listening for control signals from other base stations at a second point in time, at which second point in time the base station in question should start to measure the time of arrival and signal strength of each measured control signal.

The controlling node 210 also instructs each base station in the group regarding a third point in time when the base station should cease listening for control signals from other base stations, and a fourth point in time when the base station should transmit the measurements results to the controlling node.

The measurement results which are transmitted to the controlling node will comprise the time of arrival and signal strength of the received control signals.

Thus, in the system 200 shown in FIG. 2, the invention will be applied by letting the controlling node 210 instruct the RBSs as follows:

- The RBS 112 is instructed to transmit a known signal pattern with a predefined output power starting at a time $T_{112}$, with a time duration of $\Delta_{112}$.
- The RBS 122 is instructed to transmit a known signal pattern with a predefined output power starting at a time $T_{122} \gg T_{112}+\Delta_{112}$, with a time duration of $\Delta_{122}$.
- The RBS 132 is instructed to transmit a known signal pattern with a predefined output power starting at time $T_{132} \gg T_{122}+\Delta_{122}$, with a time duration of $\Delta_{132}$.
- The RBS 142 is instructed to transmit a known signal pattern with a predefined output power starting at time $T_{142} \gg T_{132}+\Delta_{132}$, with a time duration of $\Delta_{142}$.
- Each of the RBSs involved is instructed to measure received signal strength and timing (i.e. start time and suitably also end time) of the known signal patterns during the transmission from other RBSs Naturally, the order in which the RBSs are instructed to start their transmissions can be varied, the order shown above is merely an example. Also, the predefined output power with which the RBSs transmit is suitably defined as a percentage of the maximum output power, and is usually 100%, although other percentages can be envisioned.

Naturally, the percentage can be individualized, i.e. each RBS can be given its individual power level to transmit at, but again, the power level which will be used in most embodiments is the maximal output power level, due to the nature of the measurements and their purpose.

Suitably, the instructions to the RBSs from the controlling node 210 are sent by the controlling node as a time scheme which comprises all of the information stated above. This time scheme is distributed by the controlling node 210 to the RBSs, and the RBSs then follow this scheme.

Figure 3:
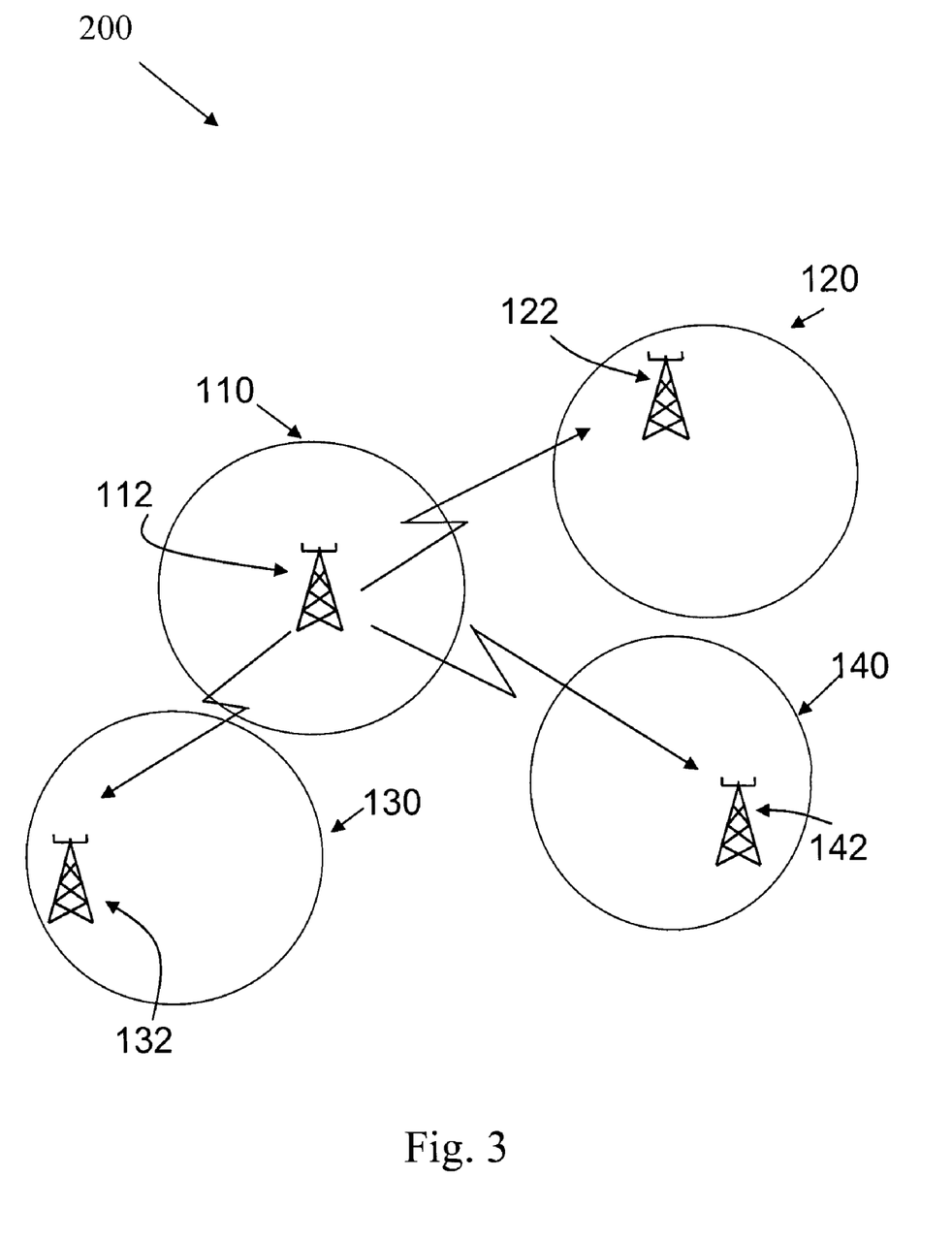

An example of how the scheme distributed by the controlling node 210 is followed by the RBSs is shown in FIG. 3, which shows the system 200 at a point in time when the RBS 112 transmits its control signal, and the other RBSs, i.e. 122, 132, 142, listen for a control signal, and note its time of arrival, and the received power level. In a version of the invention, the RBSs which listen also note the duration of the control signal, i.e. the time from when the control signal is first received until the received signal level drops below a certain level.

At a certain point in time which is suitably also comprised in the scheme distributed by the controlling node 210, each of the RBSs will transmit their measurement reports to the controlling node 210. It can be mentioned here that the measurement reports can also be transmitted from the RBSs to another node in the system, which is separate from the node 210 which distributes the time scheme. Such a separate node can also, for example, be an RBS which has been equipped with means for receiving the measurement reports.

If the receiving node is separate from the controlling node 210, the receiving node should either be able to transmit the measurement results to the controlling node 210, or as an alternative, it should be able to process the measurement results, and instruct the RBSs according to the results of said processing.

In the following, for the sake of simplicity, the receiving node will and the controlling node will be described as being one and the same.

Figure 4:
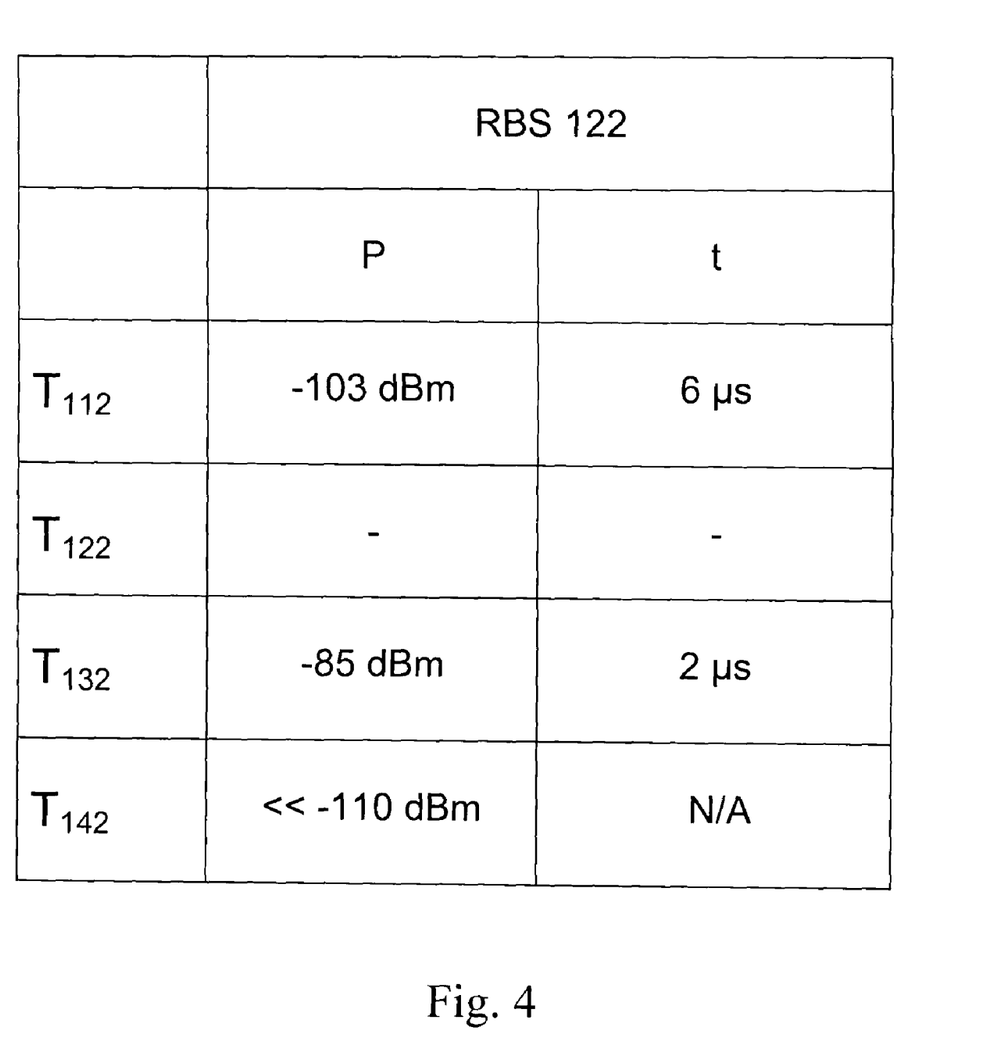
FIGS. 4 and 5 show results obtained by means of the invention.

After the last measurement, or at specified intervals, the RBSs send their measurement reports to the controlling node. FIG. 4 shows an example of one such report, in this example a report from the RBS 122 in FIG. 3. The report specifies, in this example, the received power level of the signal during each time interval, and the arrival time of each received signal.

In the embodiment where each RBS includes information of its identity in the control signal transmitted and/or other information relevant to the problem of identifying RBS to RBS interference relations, this information can be included in each report. In the embodiments where no such information is included in the control signalling, the individual RBS does not know which of the other RBSs that transmits during which period of the listening interval, but this is deduced by the controlling node 210 from the starting time of each received signal.

As can be seen from FIG. 4, the RBS 122 is interfered substantially by RBS 112, the received power level from that RBS is −103 dBm, and RBS 122 is not interfered at all by RBS 142, since the received power level from that RBS is less than −110 dBm, which in this example is the level of the internal noise in RBS 122.

We can also see that RBS 122 is interfered substantially by RBS 132, since the power level received from that RBS is −85 dBm.

Figure 5:
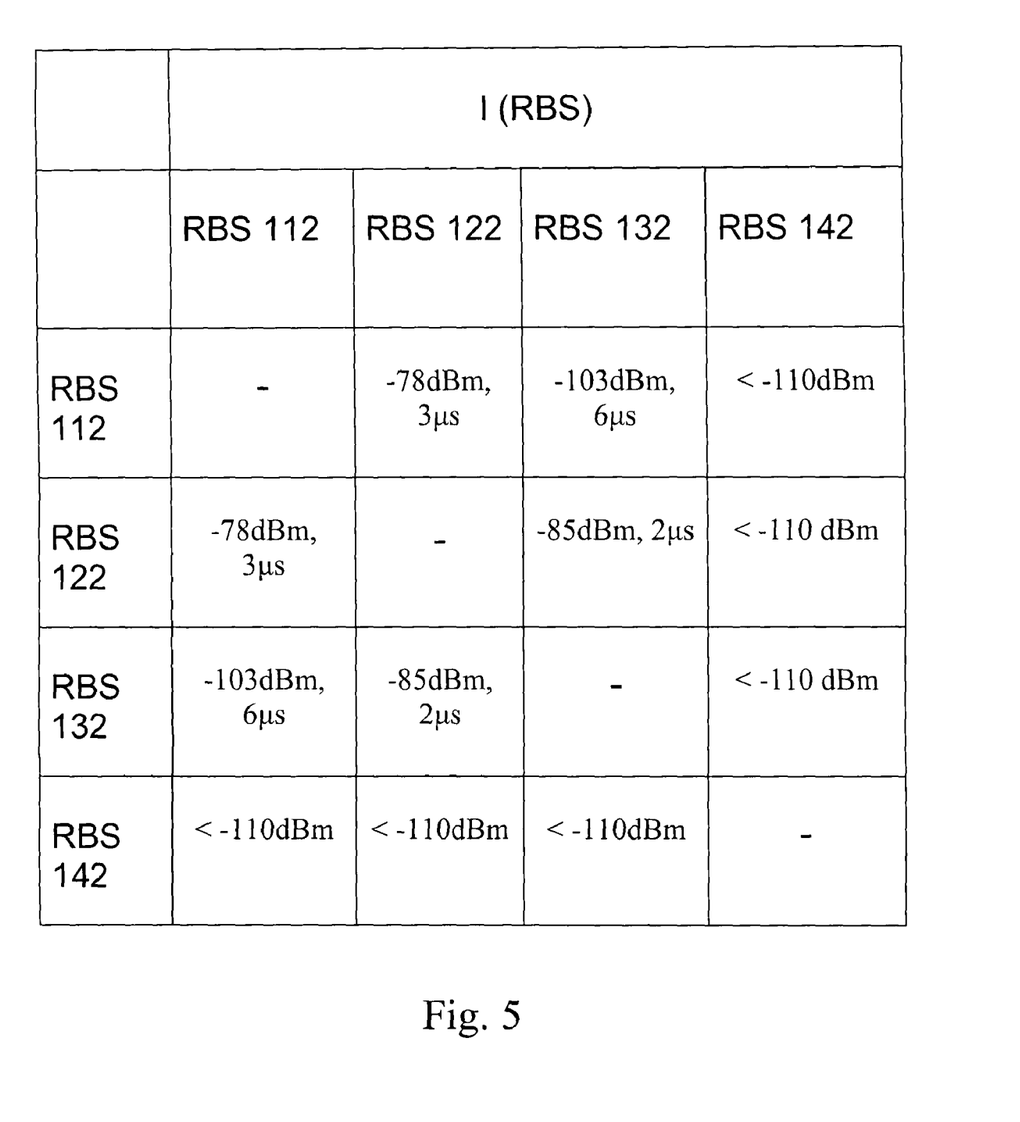

The controlling node 210 receives the measurement reports from the RBSs in the system or group of RBSs, and compiles these, suitably into a table such as the one shown in FIG. 5.

The report shows the interfering RBS, indicated as "I" in FIG. 5, and the measured values at each RBS, shown in the horizontal column of FIG. 5, for each "interfering" RBS. It can be pointed out that the reports compiled into the table of FIG. 5 do not comprise the report of FIG. 4, the table of FIG. 5 comprises reports from a different point in time. Between these points in time, the propagation conditions may have changed, due to, for example, changes in network topography.

As can be seen in FIG. 5, the RBS 142 does not interfere at all with any of the other RBSs, since the power level measured from that RBS is below −110 dBm, which is the internal noise level in the RBSs. It can also be seen that RBS 122 appears to be the largest interferer in the group.

As an example of a decision which could be made by an operator or an automated function in the system using the information in FIG. 5, the decision could be to choose to set a "global" (i.e. for the RBSs involved) guard period of 3 μs at the transition from DL to UL, which would mitigate the RBS to RBS interference involving RBS 122. Such a guard period between DL and UL would leave a weak interference between RBS 132 and RBS 112, but the interference level of −103 dBm could, for example, be handled by interleaving and/or error-protecting coding, scheduling, power control or other methods.

Figure 6:
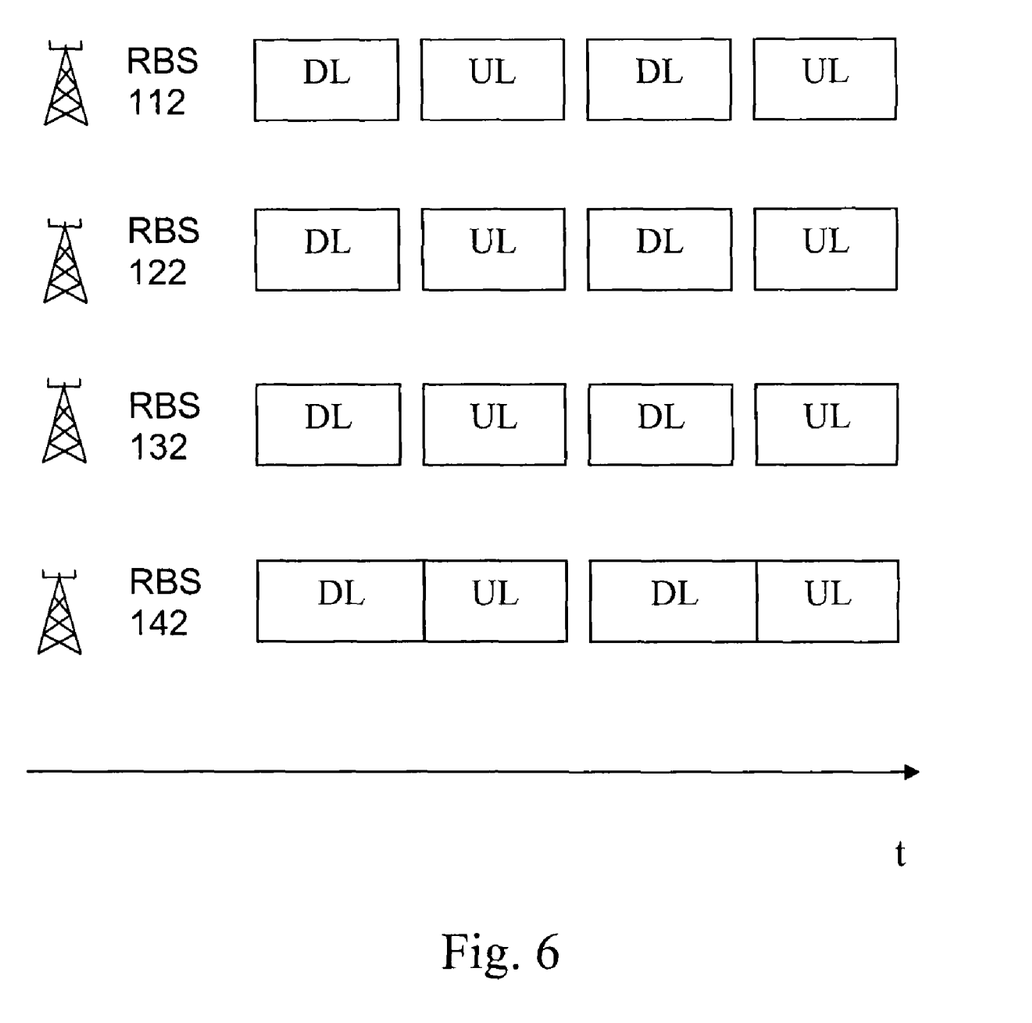
FIG. 6 shows how the invention may be applied.

An example of how the guard period at the transition from DL to UL can be set using the information shown in FIG. 5 is given in FIG. 6. As can be seen in FIG. 6, the guard period between DL and UL for each of the RBSs 112, 122 and 132 is set to one and the same, in this example 3 μs, as explained above. However, for RBS 142, there is no guard period between DL and UL, since RBS 142 does not cause any interference to any of the other RBSs in the group.

Figure 7:
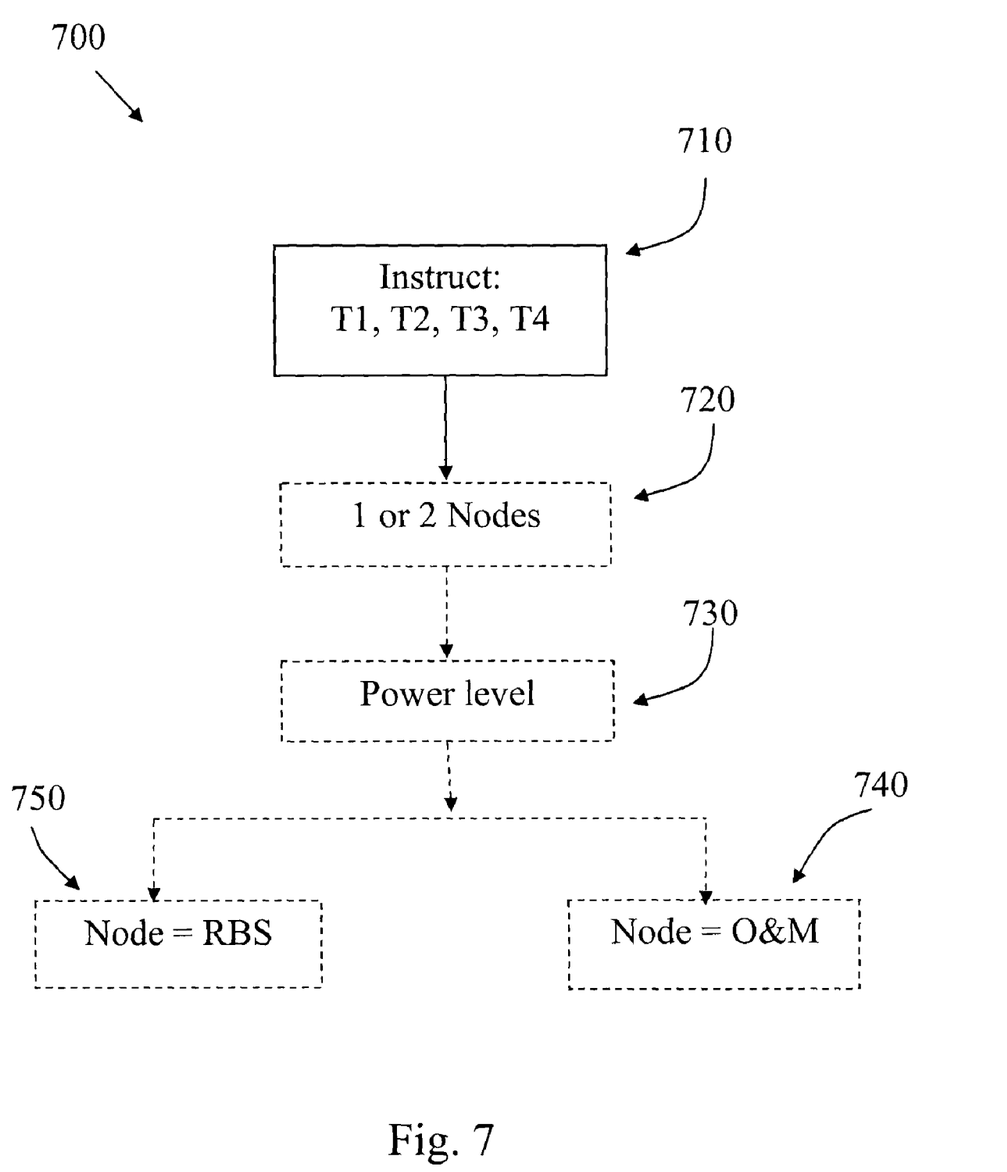
FIG. 7 shows a schematic flow chart of a method of the invention.

FIG. 7 shows a schematic flow chart 700 of some steps of the invention. Steps which are options or alternatives are shown with dashed lines, as opposed to those shown with solid lines.

In step 710, information is sent by a controlling node in the system to the RBSs about four points in time, T1, T2, T3, T4:

T1: a first point in time when the RBS which receives the instructions should start transmitting its control signal, T2: a second point in time when the RBS which receives the instruction should start to listen for control signals from other base stations, and measure their time of arrival and signal strength, T3: a third point in time when the RBS should cease listening for control signals from other base stations, T4: a fourth point in time when the RBS should transmit the measurements results to a receiving node in the system, the results comprising the time of arrival and signal strength of the control signals which have been received by the RBS between T2 and T3.

Step 720 is used to indicate that according to the method of the invention, one or two separate nodes cab be used, i.e. one node which will then be both the controlling and the receiving node, or two separate nodes, one for each of the two functions, i.e. one controlling node and none receiving node.

Step 730 shows that in addition to the times T1-T4, the controlling node can also instruct the RBS regarding which power level they should transmit their control signals at. The power level can be one and the same for each RBS, or individualized per RBS.

Steps 740 and 750 are used to show that the node or nodes which is/are used in the method can be either a central node such as an O&M node in the system or an RBS which has been equipped with means for acting as such a node or nodes. If an RBS is used as said node or nodes, it is suitably but not necessarily a node which itself also participates in the measurements.

Figure 8:
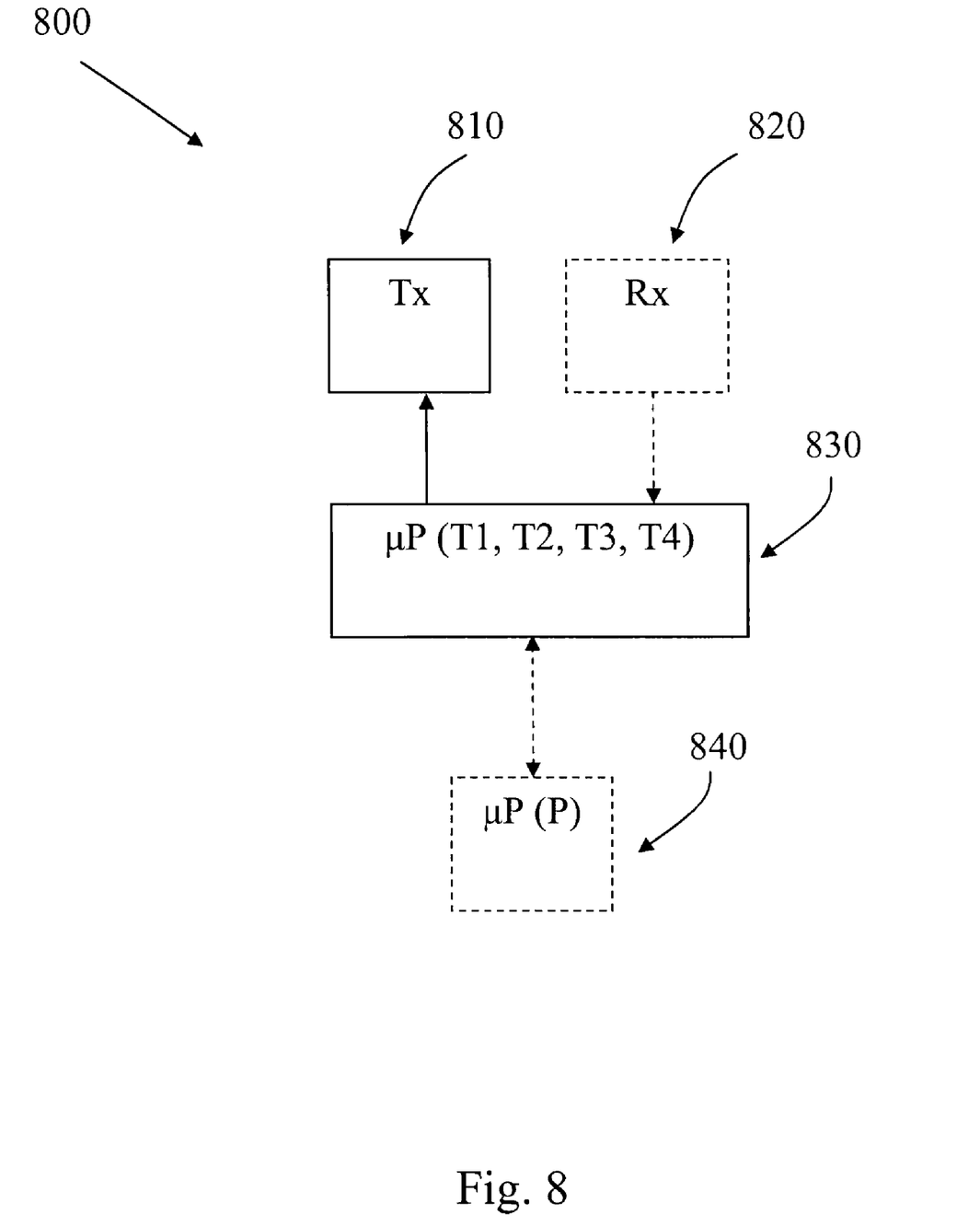
FIG. 8 shows some components of an RBS of the invention.

The invention also discloses a node which acts as the node in the description above. Such a node 800, with some major components, is shown in FIG. 8. Components which are options or alternatives are shown with dashed lines, as opposed to those which are shown with solid lines:

The node 800 of the invention comprises means 810 for sending instructions to base stations in a first plurality of base stations. These means 810 are suitably part of a transmitter of the node, and the instructions comprise the four points in time T1, T2, T3, T4, which were mentioned above in connection with FIG. 7.

Suitably, the four points in time are calculated by a calculating function 830 in the node, such as a microprocessor or other processing means, which then forwards the instructions to the transmitter 810.

The node 800 may also be equipped with means 820 for also being a receiving node, which receives measurement results from the RBSs, as described above. Suitably, these means are comprised in a receiver in the node.

As indicated by the component 840, the node 800 may further comprise means for also sending information to the RBSs about an output power level at which the transmissions should be made by the RBSs. These means are suitably part of the calculating function 830, which communicates the information about the power level to the transmitter 810.

According to the invention, the node 800 may be a central node in the system, such as an O&M node, or as an alternative, it may be an RBS in the system.

In conclusion, as can be seen by the examples given above, by means of the invention, a method is obtained for reducing the air-time resources needed to mitigate RBS to RBS interference in a TDD system, and accordingly, a TDD system can offer a higher capacity by means of the invention.

The advantages gained by means of the invention become larger in a system with a large spread in RBS to RBS propagation conditions, and in systems with a multitude of RBSs in mixed line of sight and non line of sight radio environments. Examples of such systems are mixed indoor/outdoor systems, systems with a large variety of antenna heights and/or cell sizes. The capacity increase in a system which uses the invention is estimated by the inventors to be between 2%-10%, depending on network scenario and other parameters, such as, for example, the length of the DL RBS transmission frames and UL RBS reception frames. Thus, for a delay optimized system with short frame durations, the capacity increase may be significantly larger than the percentages mentioned.

The method of the invention can also be used to reduce an operator's cost for operating cellular TDD systems by automating the guard time handling, thus significantly reducing the manual work associated with inter RBS interference management. In particular, the task of deploying new sites in a TDD system becomes less work intense, due to the fact that the interference impact from a new site can be readily measured and adjusted for without costly manual measurement or performance statistics analysis.

The invention is not limited to the examples of embodiments described above and shown in the drawings, but may be freely varied within the scope of the appended patent claims.

Thus, in another embodiment of the invention, only one RBS, for example RBS 112 is instructed by the controlling node to transmit a control signal at T1, and only one RBS, for example RBS 132 is instructed to act at times T2, T3 and T4 as described above, i.e.:

T2: a point in time when RBS 132 should start to listen for control signals from other base stations, and measure their time of arrival and signal strength, T3: a point in time when RBS 132 should cease listening for control signals from other base stations, T4: a point in time when RBS 132 should transmit the measurements results to a receiving node in the system, the results comprising the time of arrival and signal strength of the control signals which have been received by the RBS between T2 and T3.

In a version of this embodiment, the receiving node may be equipped with means for calculating measurement results for RBS 112, i.e. the transmitting RBS, using measurement results from RBS 132, as follows: the propagation time from the transmitting RBS to the receiving RBS is one of the parameters measured by the measuring node. Now, if RBS 132 is the measuring RBS and RBS 112 is the transmitting RBS, the propagation time measured by RBS 132 from RBS 112 will naturally be the same as if RBS 112 had been the measuring RBS and RBS 132 had been the transmitting RBS.

Thus, one of the factors which would have been measured by the transmitting RBS can be deduced by means of information from the measuring RBS. Similarly, the received signal level which would have been measured by RBS 112 from RBS 132 may be deduced by the receiving node in the following manner: if the measuring RBS, RBS 132, measures a signal level from RBS 112 of, for example, −85 dBm, the receiving RBS may use information gained, for example in advance, regarding the output power level of RBS 132, which is, for example, 10 dB above that of RBS 112. Thus, the receiving node may deduce that RBS 112 would have measured a signal level of −75 dBm from RBS 132, if RBS 132 had been the transmitting RBS, and RBS 112 had been the receiving RBS.

This methodology may naturally be applied to multiple other combinations of receiving/transmitting RBSs in the system.

The invention also discloses a node for use as a Radio Base Station, RBS, for use in a system of the invention. The RBS of the invention may be one of those shown in FIG. 1, i.e. 112, 122, 132, 142, and is thus for use in a cellular access system 200, for the control of the traffic to and from users in at least one cell such as those shown in FIG. 2, i.e. cells 110, 120, 130, 140.

As explained, the communication between the users in the cell and the RBS of the invention is divided into an UL period and a DL period.

The RBS 112, 122, 132, 142, of the invention comprises means for receiving and carrying out instructions form a controlling node 210, 800, in the system, which instructions can comprise information regarding:

at least a first point, T1, in time when the RBS 112, 122, 132, 142, should start transmitting a control signal, at least a second point, T2, in time when the RBS 112, 122, 132, 142, should start to listen for control signals from other base stations, and measure their time of arrival and signal strength, at least a third point, T3, in time when the RBS 112, 122, 132, 142, should cease listening for control signals from other base stations, at least a fourth point, T4, in time when the RBS 112, 122, 132, 142, should transmit the measurements results to a receiving node 210, 800, in the system 200. These results will comprise the time of arrival and signal strength of the received control signals.

The means in the RBS of the invention for carrying out the instructions of the controlling node 210, 800, can essentially be those shown in FIG. 8, i.e. the transmitter 810, the receiver 820, and the calculating means 830, 840.

In one alternative embodiment, the RBS of the invention may also be equipped with means for handling instructions from the controlling node 210, 800, to the RBS about an output power level at which the transmissions should be made by the RBSs.

Additionally, the RBS of the invention may also be equipped with means for handling instructions from the controlling node 210, 800, to the RBS 112, 122, 132, 142, according to which the control signal from the RBS should also comprise information about at least one of the following:

the identity of the transmitting RBS, the time of transmission of the control signal, the output power used by the transmitting RBS.

The invention is not limited to the examples of embodiment described above and shown in the drawings, but may be freely varied within the scope of the appended patent claims.

The invention claimed is:

1. A method for use in a cellular access system, said system comprising a first plurality of base stations, each of which controls the traffic to and from at least one cell in the system, in which system the communication between users in a cell and the base station of the cell is divided into an up link period (UL) during which users may transmit to their base station, and a down link period (DL) during which a base station may transmit to users in the cell of the base station, the method further comprising the steps of letting a controlling node in the system send instructions to a first base station and a second base station in said first plurality of base stations, wherein the instructions to the first base station comprises information regarding:

at least a first point (T1) in time when the first base station should start transmitting a control signal, and wherein the instructions to the second base station comprises information regarding:

at least a second point (T2) in time when the second base station should start to listen for control signals from other base stations, and measure their time of arrival and signal strength, at least a third point (T3) in time when the second base station should cease listening for control signals from other base stations, at least a fourth point (T4) in time when the second base station should transmit the measurements results to the controlling node, said results comprising the time of arrival and signal strength of the received control signals, wherein the controlling node uses the measurement results in order to set individual guard periods for the second base station or for a group of base stations in the system in which the second base station is comprised.

2. The method of claim 1, wherein the instructions from the controlling node to the second base station also comprise information about an output power level at which the transmissions should be made by the second base station.

3. The method of claim 1, wherein the controlling node is a central node in the system, such as an O&M node.

4. The method of claim 1, wherein at least one of the controlling node or a receiving node is a base station in the system which has been equipped with means for acting as said controlling node and/or receiving node.

5. The method of claim 1, wherein the transmitted control signal includes information about at least one of the following:
- the identity of the transmitting base station,
- the time of transmission of the control signal,
- the output power used by the transmitting base station.

6. The method of claim 1, wherein the information which is sent to the first base station is also sent to all of the other base stations in the plurality of base stations, and wherein the information which is sent to the second base station is also sent to all of the other base stations in the plurality of base stations.

7. A node for use in a cellular access system, said system comprising a first plurality of base stations, each of which controls the traffic to and from at least one cell in the system, in which system the communication between users in a cell and the base station of the cell is divided into an up link period (UL) during which users may transmit to their base station, and a down link period (DL) during which a base station may transmit to users in the cell of the base station, wherein the node comprises means for sending instructions to at least a first base station and a second base station in said first plurality of base stations, wherein the instructions to the first base station comprises information regarding:
- at least a first point (T1) in time when the base station which receives the instructions should start transmitting a control signal, and wherein the instructions to the second base station comprises information regarding:
- at least a second point (T2) in time when the second base station should start to listen for control signals from other base stations, and measure their time of arrival and signal strength,
- at least a third point (T3) in time when the second base station should cease listening for control signals from other base stations,
- at least a fourth point (T4) in time when the second base station should transmit the measurements results to the controlling node in the system, said results comprising the time of arrival and signal strength of the received control signals, the node also comprising means for sending instructions to said first and/or second base station regarding the length of a guard period (GP) in each base station at a transition point between the UL and DL periods, or between the DL and UL periods.

8. The node of claim 7, further comprising means for also sending information to the second base station about an output power level at which the transmissions should be made by the base station.

9. The node of claim 7, said node being a central node in the system, such as an O&M node.

10. The node of claim 7, said node being an RBS in the system.

11. The node of claim 7, said node further being equipped with means for sending the information which is sent to the first base station to all of the other base stations in the plurality of base stations, and also for sending the information which is sent to the second base station to all of the other base stations in the plurality of base stations.

12. A node for use as a Radio Base Station, RBS, for use in a cellular access system for the control of the traffic to and from users in at least one cell in the system, in which system the communication between the users in the cell and the RBS is divided into an up link period (UL) during which the users may transmit to the RBS, and a down link period (DL) during which the RBS may transmit to the users, wherein the RBS comprises means for receiving and carrying out instructions from a controlling node in the system, the instructions to the RBS comprising information regarding:
- at least a first point (T1) in time when the RBS should start transmitting a control signal,
- at least a second point (T2) in time when the RBS should start to listen for control signals from other base stations, and measure their time of arrival and signal strength,
- at least a third point (T3) in time when the RBS should cease listening for control signals from other base stations,
- at least a fourth point (T4) in time when the RBS should transmit the measurements results to a receiving node in the system, said results comprising the time of arrival and signal strength of the received control signals,
- the length of a guard period (GP) in the RBS at a transition point between the UL and DL periods, or between the DL and UL periods.

13. The RBS of claim 12, in which the instructions from the controlling node to the RBS can also comprise information about an output power level at which the transmissions should be made by the RBSs, the RBS also being equipped with means for carrying out such instructions.

14. The RBS of claim 12, comprising means for carrying out instructions from the controlling node to the RBS according to which the transmitted control signal from the RBS should also comprise information about at least one of the following:
- the identity of the transmitting RBS,
- the time of transmission of the control signal,
- the output power used by the transmitting RBS.

* * * * *